June 15, 1965 — R. G. MAURO — 3,188,900
ROLLER TYPE DIE CUTTER
Filed Dec. 4, 1962 — 3 Sheets-Sheet 1

INVENTOR.
RICHARD G. MAURO
BY Lew Edelson
ATTORNEY

INVENTOR.
RICHARD G. MAURO

INVENTOR
RICHARD G. MAURO
BY
ATTORNEY united States Patent Office 3,188,900
Patented June 15, 1965

3,188,900
ROLLER TYPE DIE CUTTER
Richard G. Mauro, 8628 Alicia St., Philadelphia, Pa.
Filed Dec. 4, 1962, Ser. No. 242,137
4 Claims. (Cl. 83—663)

This invention relates generally to cutting dies, and more particularly, relates to a novel construction of roller mounted cutting dies adapted for blanking out desired shapes from a continuous web of material or from individual pre-cut sections of material, as desired.

Briefly, the invention contemplates the provision of a die base assembly of a given thickness which is contoured on its undersurface to lie flatwise upon the cylindrical surface of a roller, and is also adapted for securement thereto in a desired position to thereby properly locate the cutting edges of the die which are carried by the base and rigidly anchored thereby to the roller. By making the die detachable from the roller, it is possible to quickly and easily remove one die from the surface of the roller and replace it with a different die as required, the dies being made in sections and occupying a relatively small space when demounted from the roller so that a relatively large number of different dies may be held in readiness of use without requiring storage facilities of large volume. The dies according to the invention are so made that the component parts thereof are relatively quickly, easily, and inexpensively replaced in the event of loss or damage thereto. Accordingly, it is a primary object of this invention to provide a novel roller type die cutting assembly which includes a plurality of cutting edges mountable by means of a base assembly to the surface of a rotatable roller so that the cutting edges of the die may be moved successively into cutting engagement with the material to be formed in a periodic manner as the roller rotates.

Another object of this invention is to provide a novel roller type die cutter assembly as aforesaid in which the cutting edges of the die are formed by a plurality of discrete parts assembled into a working whole by the base assembly which secures the cutting elements to the roller surface.

Still another object of this invention is to provide a novel roller type die cutter assembly which is quickly and easily securable to and detachable from the roller device with which it is used and thereby requires a minimum set-up time.

A further object of this invention is to provide a novel rotary die cutter assembly which is relatively inexpensive to make, easy to maintain and which occupies a relatively small volume of storage space when demounted from the roller with which it is used.

The foregoing and other objects of this invention will become clear from a reading of the following specification in conjunction with an examination of the appended drawings, wherein.

In the several figures, like elements are denoted by like reference characters.

Figure 1:
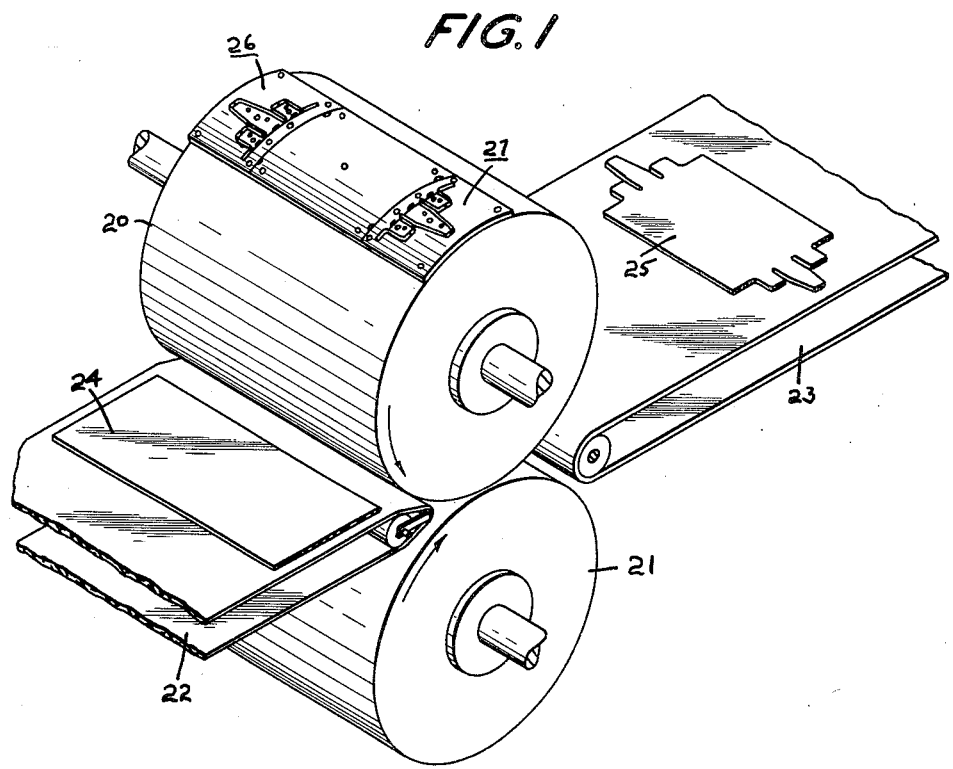
FIGURE 1 is a perspective view illustrating in representational form the novel roller type die assembly and the die cutting of a blank sent into the roller system.
Figure 3:
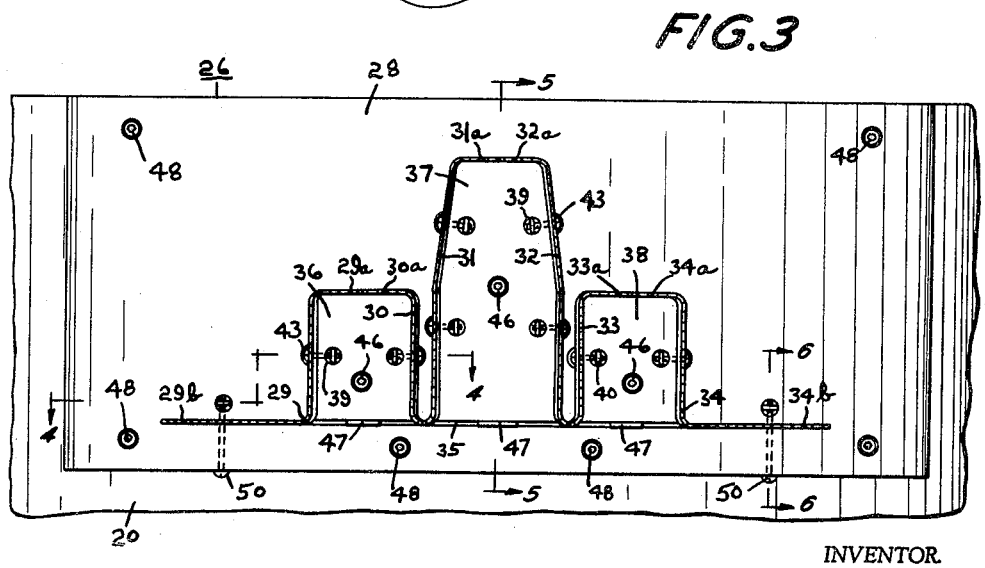
FIGURE 3 is a plan view on a somewhat reduced scale of the die section shown in perspective in FIGURE 2.

Referring now to FIGURE 1, there will be seen a drive roller 20 disposed vertically above a follower roller 21 which each rotate is indicated by the arrows, and a pair of conveyor belts 22 and 23 which respectively feed a blank 24 between the rollers and carry away the shaped piece 25 which has been cut out from the blank 24 by means of the die sections 26 and 27 secured to the cylindrical surface of the drive roller 20. The die sections 26 and 27 are mirror images of one another, and in some cases will be identical as is for example shown in the illustrated configuration best seen in the showings of FIGURES 2 and 3 to which attention should be now directed.

Figure 2:
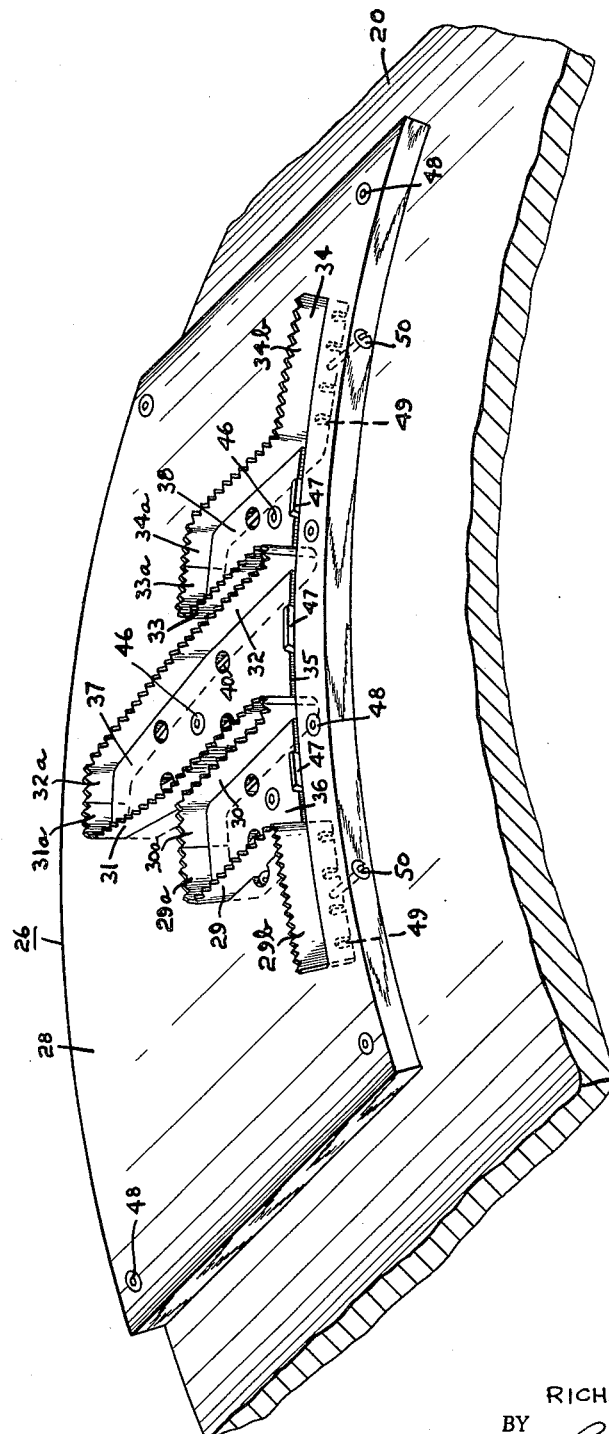
FIGURE 2 is a perspective view on an enlarged scale of one die cutting section of the complete die shown in FIGURE 1.
Figure 4:
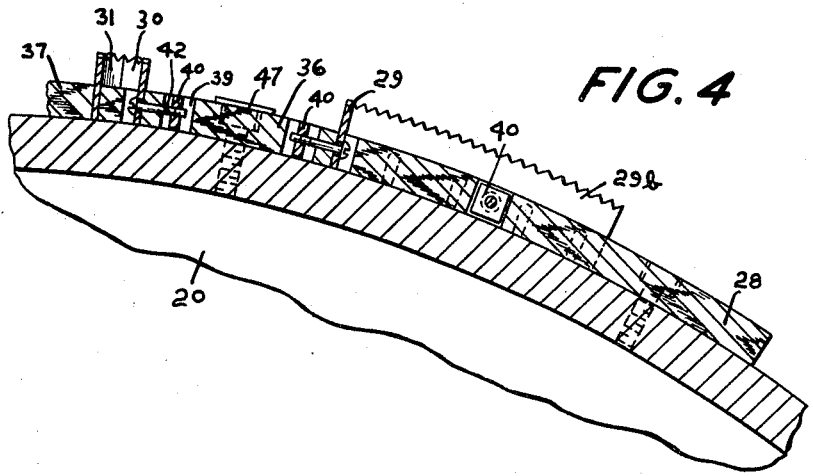
FIGURE 4 is a cross-sectional view taken vertically through the die section of FIGURE 3 perpendicular to the cylindrical axis of the die carrying roller, as would be seen in enlarged section when viewed along the line 4—4 of FIGURE 3.

The die section 26 includes a base element 28 which has been cut completely vertically therethrough along a line defined by the positions of the cutting elements 29 through 34 and also along the straight line 35 within which the terminal ends of cutting elements 29 and 34 are colinearly disposed, to thereby cut out from the base element 28 the three forming blocks 36, 37 and 38. The base element 28 is of arcuate shape, as is best seen in FIGURES 1 and 2, and of the proper curvature to fit exactly to the cylindrical surface of the roller 20. The cut 35 and those cuts defined by the positions of the cutting elements are all oriented in a radial sense relative to the cylinder 20 and are of a thickness equal to the thickness of the cutting elements 29 through 34, so that the cutting elements 29 through 34 all lie along radii of the cylindrical roller 20. The die section 26 is assembled to the roller in the following manner.

Figure 7:
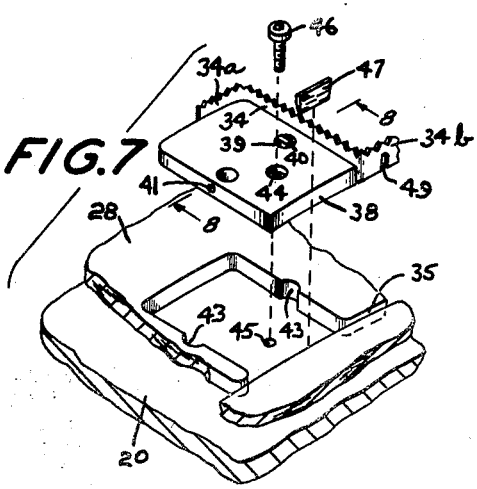
FIGURE 7 is an enlarged partially exploded perspective view of a portion of the die section shown in FIGURE 2 illustrating the interfitting arrangement of several parts of the die section.
Figure 8:
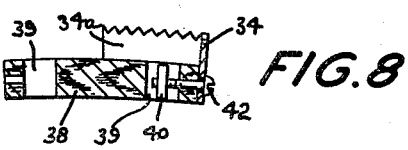
FIGURE 8 is an enlarged vertical sectional view through a portion of the exploded die assembly section, as would be seen when viewed along the line 8—8 of FIGURE 7.

The cutting elements 29 through 34 are first secured to their associated forming blocks 36, 37 or 38. To effect such securement, each of the forming blocks is provided with a plurality of vertical holes 39 of sufficient diameter to receive therein square nuts 40 disposed in vertical fashion so that the nuts are not free to rotate in any direction but are maintained in substantially fixed position as seen throughout FIGURES 2 through 8. Each of the forming blocks is provided with a bore 41 extending horizontally through the sidewall thereof closest to the holes 39 and orthogonal to the latter so that the shank of a machine screw 42 may be projected therethrough and into threaded engagement with the threads of the nut 40 disposed within the holes 39 after being first projected through a hole in the cutting element. As is most clearly seen in the showing of FIGURES 7 and 8 it is the nuts 40 and machine screws 42 which lock the cutting elements to their associated forming blocks, FIGURES 7 and 8 showing the securement of cutting element 34 to its forming block 38. Since the heads of the machine screws 42 are rounded, the base element 28 is also semi-circularly cut out as at 43 to permit the heads of the machine screws to be disposed therewithin.

Figure 5:
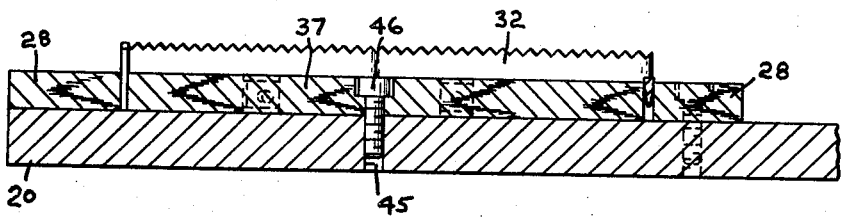
FIGURE 5 is an enlarged vertical sectional view through the die assembly section of FIGURE 3 taken in a radial plane passing through the cylindrical axis of the roller which carries the die assembly, as would be seen when viewed along the line 5—5 of FIGURE 3.
Figure 6:
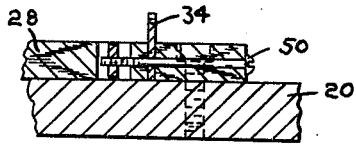
FIGURE 6 is an enlarged vertical sectional view taken in the same manner as that of FIGURE 5 but as would be seen when viewed along the line 6—6 of FIGURE 3.

As best seen in FIGURES 5 and 7, the several forming blocks are also provided with vertical holes 44 which register with threaded bores 35 disposed immediately therebeneath and extending radially inward from the outer surface of the roller 20. Each of the forming blocks 36, 37 and 38 is fixedly securable in position to the drive roller 20 by means of socket head bolts 46 projectable downward through the holes 44 and into head seating engagement with the forming blocks with the threaded shanks of the bolts threadedly engaged with the threaded bores 45 of the drive roller 20. The relationship of the holes 44 through the forming blocks 36, 37 and 38 to the underlying threaded bores 45 formed in the drive roller 20 is such that the two holes are brought into vertical alignment in order to permit threaded engagement of the socket head bolts 46 within the bores 45 only when the forming blocks with the associated cutting elements attached thereto have been fitted into their respective cut out of the base element 28 and forced axially endwise of the roller 20 so as to clamp the ends of the cutting elements, designated as 29a through 34a, between the base element 28 and the associated forming block.

This positioning of the forming block is effected by means of the wedges 47 which are driven downward into the cut line 35 between each of the forming blocks 36, 37 and 38 on the one hand and a portion of the base element 28 on the other hand to thereby force the forming blocks outward to clamp the ends of the cutting elements as previously mentioned. When the forming blocks have been properly positioned they are fixedly secured to the roller by the socket head bolts 46 as previously described. Of course, prior to positioning of the forming blocks and securement thereof to the drive roller 20 the base element 28 is itself secured to the surface of the drive roller as by means of the socket head bolts 48 best seen in FIGURES 2 and 3. Once the forming block securing bolts 46 have been pulled up tightly, the presence of the wedges 47 is no longer required and if desired these may be removed.

As is most clearly seen in the illustrations of FIGURES 2 and 7, the circumferentially extending free ends 29b and 34b of cutting elements 29 and 34 respectively are constrained to follow the curvature of the cylindrical surface of the drive roller 20 and are therefore provided with a plurality of spaced kerfs 49 which facilitate the arcuate forming of these cutting element ends. Additionally, the ends 29b and 34b of the cutting elements being otherwise unsecured are held in position within the base element 28 by means of machine screws and nuts 50 projected through holes cut through the base element 28 and the lower edges of the cutting elements 29 and 34 between a pair of the previously mentioned kerfs 49, this being best illustrated in FIGURES 2, 3 and 6.

The active edges of the cutting elements 29 through 34 are shown as serrated, but the cutting edges of these elements may be of conventional knife edge or other form as deemed most suitable to the particular cutting operation that is contemplated. Additionally, while the base element 28, and hence the forming blocks 36, 37 and 38 are cut therefrom, is shown as being made of wood, this is not required and the base element may be made of any suitable material. Moreover, while FIGURE 1 illustrates the die cutting of a shaped piece 25 from a pre-cut blank 24 of predetermined size, the roller 20 may be provided with a plurality of die sections 26 and 27 extending continuously about the cylindrical circumference thereof so that a continuous web or sheet of material may be fed into the rollers 20 and 21 to thereby produce a plurality of shaped pieces for each complete rotation of the roller 20. Of course, in this case it would be necessary to also include cutting elements extending between the die sections 26 and 27 axially of the roller 20 to transversely cut the shaped pieces and provide completely formed individually cut pieces.

It will also be understood that the die section 27 need not be of the same or mirror image shape of die section 26, but may be of an entirely different shape as determined by the desired contour of the final shaped piece. Moreover, there is no inherent limitation in the type of shaped piece which may be formed, and contouring of such pieces is not limited to an external boundary. In this regard, double boundary dies of continuous perimeter may be readily constructed to produce a variety of shapes, as for example annular circular washers of generally O-shape may be produced.

Having now described my invention in connection with a particularly illustrated embodiment thereof, it will be appreciated that variations and modifications of my invention may now occur from time to time to those persons normally skilled in the art without departing from the essential spirit or scope of my invention, and accordingly it is intended to claim the same broadly as well as specifically as indicated by the appended claims.

What is claimed as new and useful is:

1. A die section for mounting upon the curved surface of a roller to form with the latter a rotary die cutting device, comprising in combination, a base assembly having an undersurface contoured to the shape of the roller surface upon which it is to be mounted, said base assembly including a base element and a plurality of separate forming blocks cut therefrom in such manner that when the forming blocks are placed in their originally integral positions at least some of the edges thereof define with the facing edges of the base element a channel in the shape of the pattern which it is desired to cut with the die section, a plurality of separate cutting elements fixedly detachably secured individually to the pattern channel forming edges of said forming blocks and so shaped that they fit snugly into the pattern channel when the forming blocks are placed in their originally integral positions with the cutting edges of the cutting elements extending above the upper surface of the base assembly, said cutting elements being aligned in continuation of one another to form the complete die pattern, means extending between said forming blocks and base element effective to lock said forming blocks and cutting elements to said base element to form a unitary base assembly, and means for securing said base assembly as a unit to the roller upon which it is to be mounted.

2. A die section as defined in claim 1 wherein the contour of the base assembly undersurface is that of a cylindrical surface, and the cutting elements lie in radial planes intersecting the axis of rotation of the roller to which the die section is mounted.

3. A die section as defined in claim 1 wherein said means extending between said forming blocks and base element effective to lock said forming blocks and cutting elements to said base element are wedge elements which force said forming blocks toward said base element to tightly clamp said cutting elements therebetween.

4. A die assembly as defined in claim 1 wherein the cutting edges of said cutting elements extending above the upper surface of the base assembly lie in a surface substantially concentric with the undersurface of the base assembly.

References Cited by the Examiner

UNITED STATES PATENTS

| | | | |
|---|---|---|---|
| 1,310,922 | 7/19 | Novick | 83—346 |
| 2,235,948 | 3/41 | Schwisow | 83—698 |
| 2,863,337 | 12/58 | Ackley | 83—698 |
| 3,036,478 | 5/62 | Scott et al. | 76—107 |
| 3,049,039 | 8/62 | Wright | 83—652 |
| 3,119,312 | 1/64 | Henc | 76—107 |
| 3,150,550 | 9/64 | Berlin et al. | 83—13 |

ANDREW R. JUHASZ, *Primary Examiner.*

HUNTER C. BOURNE, JR., *Examiner.*